US012672104B2

(12) United States Patent
Hong

(10) Patent No.: US 12,672,104 B2
(45) Date of Patent: Jun. 30, 2026

(54) METHOD FOR TRANSMITTING INFORMATION, USER EQUIPMENT, ACCESS NETWORK DEVICE, AND CORE NETWORK

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 286 days.

(21) Appl. No.: 18/287,850

(22) PCT Filed: Apr. 21, 2021

(86) PCT No.: PCT/CN2021/088811
§ 371 (c)(1),
(2) Date: Oct. 20, 2023

(87) PCT Pub. No.: WO2022/222086
PCT Pub. Date: Oct. 27, 2022

(65) Prior Publication Data
US 2024/0365283 A1      Oct. 31, 2024

(51) Int. Cl.
*H04W 68/02* (2009.01)
*H04W 48/10* (2009.01)
*H04W 88/06* (2009.01)
(52) U.S. Cl.
CPC .......... *H04W 68/02* (2013.01); *H04W 48/10* (2013.01); *H04W 88/06* (2013.01)

(58) Field of Classification Search
CPC ..... H04W 68/02; H04W 48/10; H04W 88/06; H04W 68/005; H04W 48/12
See application file for complete search history.

(56) References Cited

U.S. PATENT DOCUMENTS

| | | | | |
|---|---|---|---|---|
| 2020/0344719 A1* | 10/2020 | Luo | ..................... | H04W 68/005 |
| 2021/0144674 A1* | 5/2021 | Zhang | ................... | H04W 72/23 |
| 2022/0191824 A1* | 6/2022 | Kumar | ................. | H04W 68/02 |

(Continued)

FOREIGN PATENT DOCUMENTS

| | | | | |
|---|---|---|---|---|
| CN | 112166634 A | 1/2021 | | |
| EP | 3479630 B1 * | 9/2020 | .......... | H04W 68/005 |
| EP | 3800949 A1 | 4/2021 | | |

(Continued)

OTHER PUBLICATIONS

VIVO "Introduction of Paging Cause" 3GPP TSG-RAN WG2 Meeting #113bis-e, R2-2103348, Apr. 2021, 6 pages (Year: 2021).*

(Continued)

*Primary Examiner* — Yuwen Pan
*Assistant Examiner* — Swati Jain
(74) *Attorney, Agent, or Firm* — Cozen O'Connor

(57) ABSTRACT
A method for transmitting information is performed by an access network device. The method includes sending at least one of first indication information or core network information to a user equipment (UE). The first indication information is configured to indicate whether a core network connected to the access network device supports sending a paging reason, and the core network information includes information of a core network that supports sending the paging reason.

17 Claims, 6 Drawing Sheets send second indication information to the UE through the NAS signaling

501

(56) References Cited

U.S. PATENT DOCUMENTS

2022/0330202 A1 \* 10/2022 Kumar ................. H04W 60/00
2023/0300947 A1 \* 9/2023 Kavuri .................... H04W 8/24
                                                         370/329

FOREIGN PATENT DOCUMENTS

WO      WO 2018005419 A1      1/2018
WO      WO 2020209620 A1      10/2020
WO      WO 2021066562 A1      4/2021

OTHER PUBLICATIONS

PCT/CN2021/088811, International Search Report dated Dec. 27, 2021, 2 pages.
VIVO "Introduction of Paging Cause" 3GPP TSG-RAN WG2 Meeting #113bis-e, R2-2103348, Apr. 2021, 6 pages.
European Patent Application No. 21937328.9, Search and Opinion dated Jan. 21, 2025, 8 pages.

\* cited by examiner

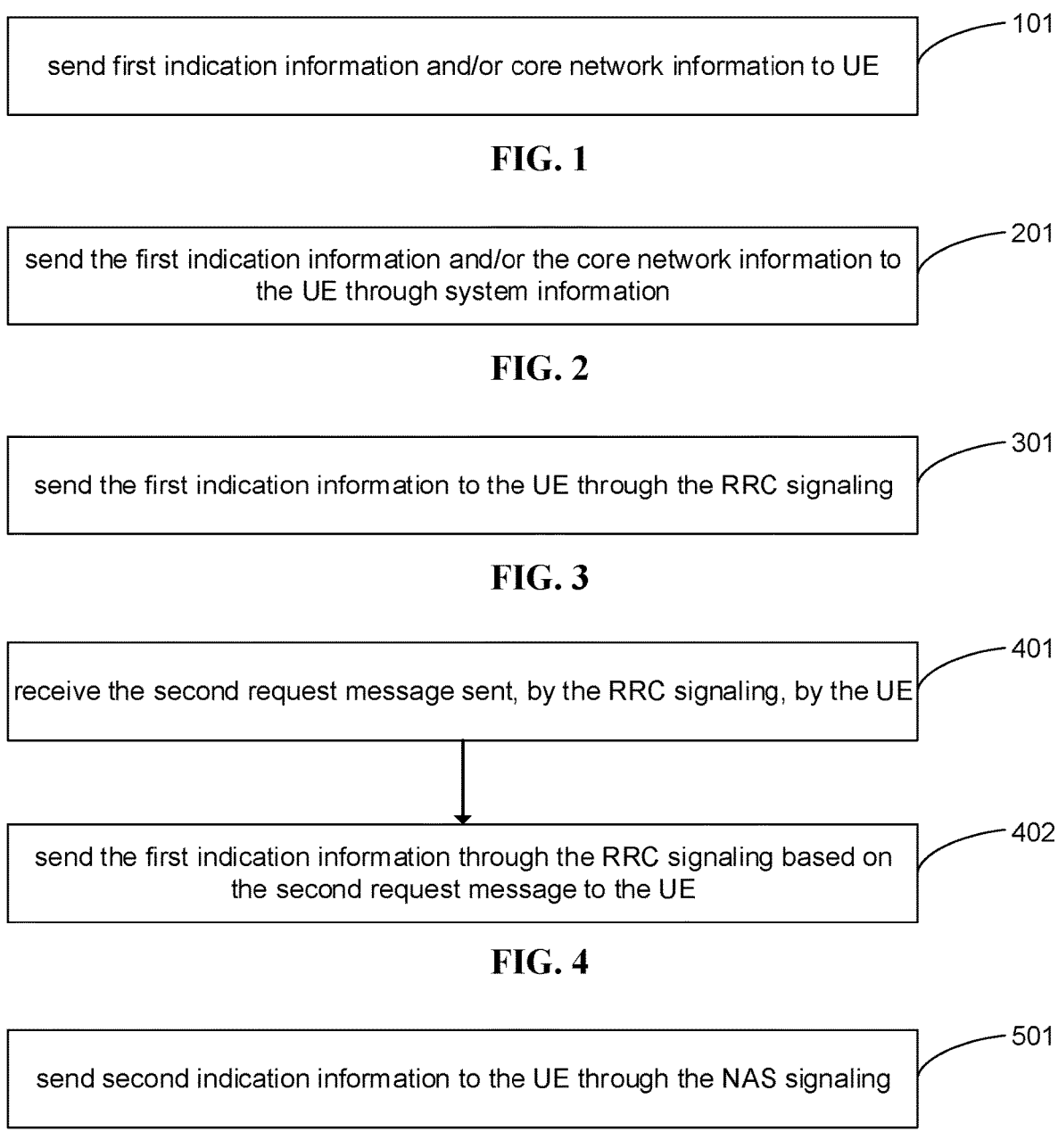

send first indication information and/or core network information to UE — 101

FIG. 1 send the first indication information and/or the core network information to the UE through system information — 201

FIG. 2 send the first indication information to the UE through the RRC signaling — 301

FIG. 3 receive the second request message sent, by the RRC signaling, by the UE — 401 send the first indication information through the RRC signaling based on the second request message to the UE — 402

FIG. 4 send second indication information to the UE through the NAS signaling — 501

FIG. 5

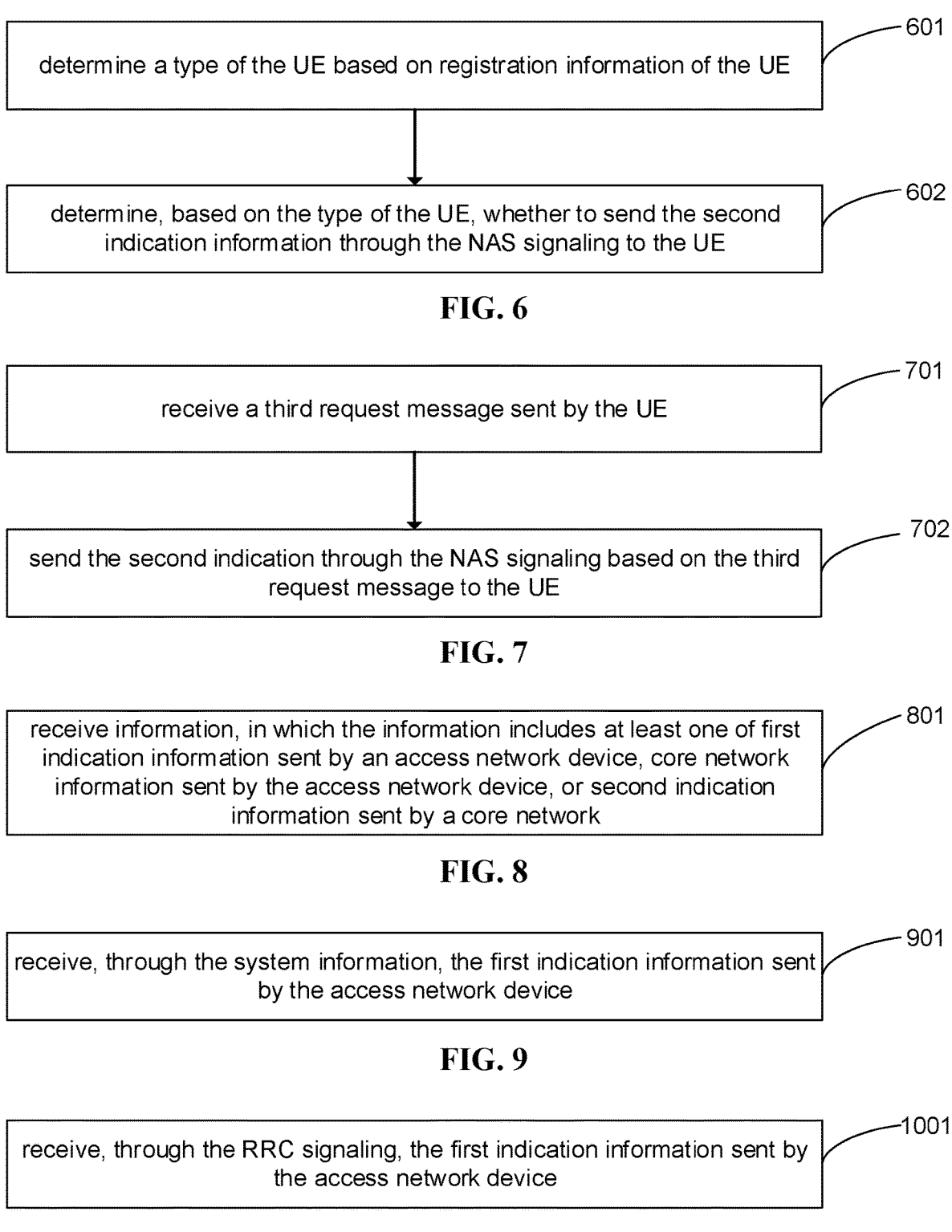

determine a type of the UE based on registration information of the UE ⟋601 determine, based on the type of the UE, whether to send the second indication information through the NAS signaling to the UE ⟋602

FIG. 6 receive a third request message sent by the UE ⟋701 send the second indication through the NAS signaling based on the third request message to the UE ⟋702

FIG. 7 receive information, in which the information includes at least one of first indication information sent by an access network device, core network information sent by the access network device, or second indication information sent by a core network ⟋801

FIG. 8 receive, through the system information, the first indication information sent by the access network device ⟋901

FIG. 9 receive, through the RRC signaling, the first indication information sent by the access network device ⟋1001

FIG. 10 receive, through the system information, the core network information sent by the access network device ───1101

FIG. 11 receive, through the RRC signaling, the core network information sent by the access network device ───1201

FIG. 12 receive the first indication information and the core network device sent by the access network device ───1301

FIG. 13 receive, through the NAS signaling, the second indication information sent by the core network ───1401

FIG. 14 receive the first indication information sent by the access network device and the second indication information sent by the core network ───1501

FIG. 15 receive the core network device sent by the access network device and the second indication information sent by the core network ───1601

FIG. 16 receive the first indication information and the core network device sent by the access network device and the second indication information sent by the core network ───1701

FIG. 17

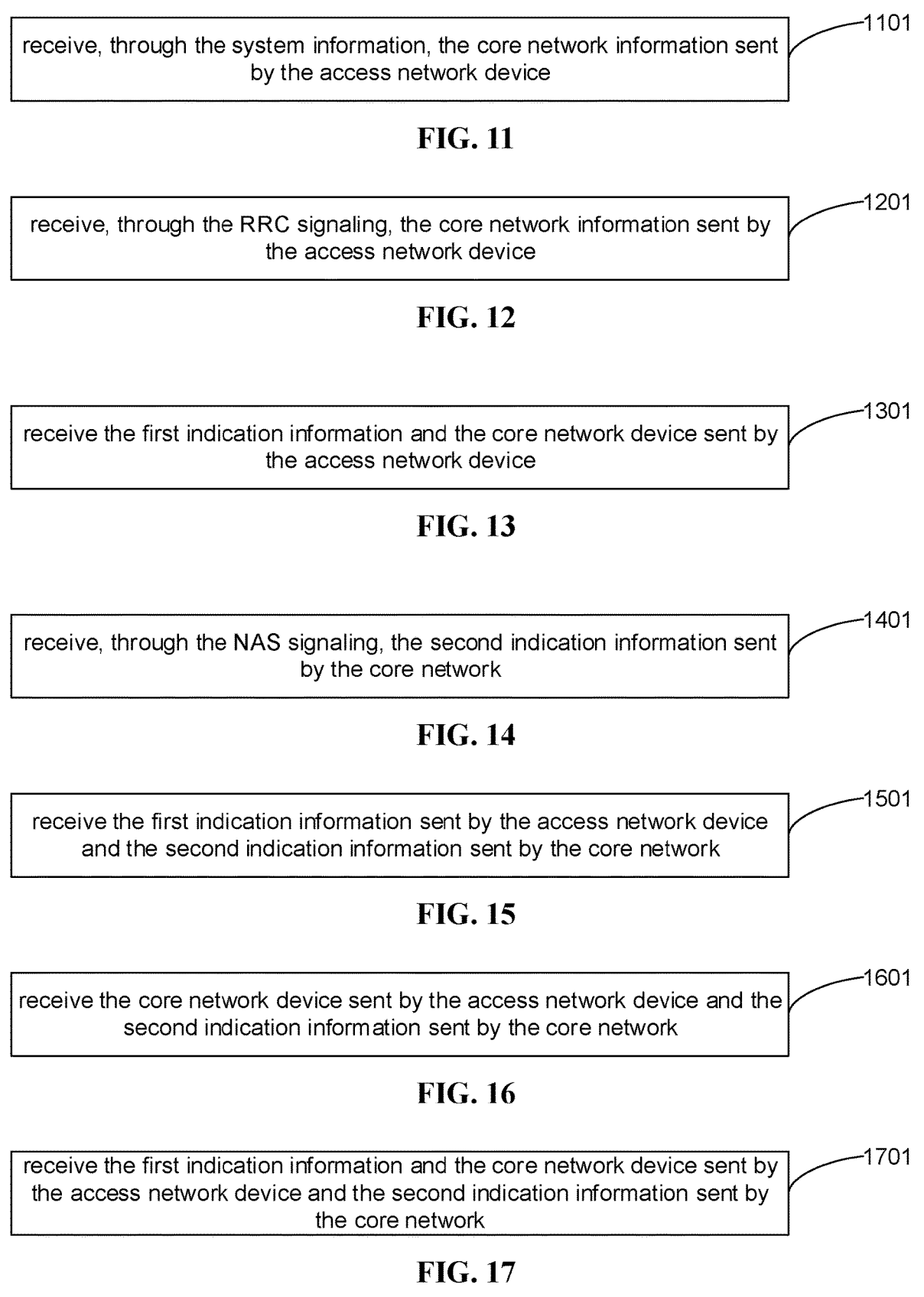

METHOD FOR TRANSMITTING INFORMATION, USER EQUIPMENT, ACCESS NETWORK DEVICE, AND CORE NETWORK

CROSS-REFERENCE TO RELATED APPLICATION

This application is a U.S. national phase application of International Application No. PCT/CN2021/088811, filed on Apr. 21, 2021, the content of which is hereby incorporated by reference in its entirety for all purposes.

TECHNICAL FIELD

The disclosure relates to the field of communication technology, and in particular to a method or an apparatus for transmitting information, a user equipment, an access network device, a core network and a storage medium.

BACKGROUND

With the rapid development of wireless communication technology and mobile terminals, multi-card terminal technology has been widely used. The multi-card terminal may be a device provided with multiple SIM (Subscriber Identity Module) cards, in which each SIM card corresponds to a different communication system, so that the multi-card terminal can be provided with services from the multiple communication systems at the same time.

SUMMARY

In one aspect of embodiments of the disclosure, a method for transmitting information is provided. The method is performed by an access network device. The method includes:

sending at least one of first indication information or core network information to a user equipment (UE), in which the first indication information is configured to indicate whether a core network connected to the access network device supports sending a paging reason, and the core network information includes information of a core network that supports sending the paging reason.

In another aspect of embodiments of the disclosure, a method for transmitting information is provided. The method is performed by a core network. The method includes:

sending second indication information to a user equipment (UE) through a non-access stratum (NAS) signaling, in which the second indication information is configured to indicate whether the core network supports sending a paging reason.

In yet another aspect of embodiments of the disclosure, a method for transmitting information is provided. The method is performed by a user equipment (UE). The method includes:

receiving information, in which the information includes at least one of first indication information sent by an access network device, core network information sent by the access network device, or second indication information sent by a core network; in which the first indication information is configured to indicate whether a core network connected to the access network device supports sending a paging reason, the core network information includes the information of a core network that supports sending the paging reason, and the second indication information is configured to indicate whether a core network that sends the second indication information supports sending the paging reason.

In yet another aspect of embodiments of the disclosure, a user equipment is provided. The user equipment includes a transceiver; a memory; and a processor. The processor is connected to the transceiver and the memory, and is configured to control the transceiver to transmit and receive a wireless signal and to perform the above-mentioned method according to yet another embodiments by executing computer-executable instructions stored on the memory.

In yet another aspect of embodiments of the disclosure, an access network device is provided. The access network device includes a transceiver; a memory; and a processor. The processor is connected to the transceiver and the memory, and is configured to control the transceiver to transmit and receive a wireless signal and to perform the above-mentioned method according to yet another embodiments by executing computer-executable instructions stored on the memory.

In yet another aspect of embodiments of the disclosure, a core network is provided. The core network includes a transceiver; a memory; and a processor. The processor is connected to the transceiver and the memory, and is configured to control the transceiver to transmit and receive a wireless signal and to perform the above-mentioned method according to yet another embodiments by executing computer-executable instructions stored on the memory.

BRIEF DESCRIPTION OF THE DRAWINGS

The above and/or additional aspects and advantages of the disclosure will become apparent and readily understood from the following description of embodiments taken in conjunction with the accompanying drawings.

FIG. 1 is a schematic flowchart illustrating a method for transmitting information applied to an access network device according to an embodiment of the disclosure.

FIG. 2 is a schematic flowchart illustrating a method for transmitting information according to another embodiment of the disclosure.

FIG. 3 is a schematic flowchart illustrating a method for transmitting information according to yet another embodiment of the disclosure.

FIG. 4 is a schematic flowchart illustrating a method for transmitting information according to yet another embodiment of the disclosure.

FIG. 5 is a schematic flowchart illustrating a method for transmitting information applied to a core network according to yet another embodiment of the disclosure.

FIG. 6 is a schematic flowchart illustrating a method for transmitting information according to yet another embodiment of the disclosure.

FIG. 7 is a schematic flowchart illustrating a method for transmitting information according to yet another embodiment of the disclosure.

FIG. 8 is a schematic flowchart illustrating a method for transmitting information applied to a user equipment according to yet another embodiment of the disclosure.

FIG. 9 is a schematic flowchart illustrating a method for transmitting information according to yet another embodiment of the disclosure.

FIG. 10 is a schematic flowchart illustrating a method for transmitting information according to yet another embodiment of the disclosure.

FIG. 11 is a schematic flowchart illustrating a method for transmitting information according to yet another embodiment of the disclosure.

FIG. 12 is a schematic flowchart illustrating a method for transmitting information according to yet another embodiment of the disclosure.

FIG. 13 is a schematic flowchart illustrating a method for transmitting information according to yet another embodiment of the disclosure.

FIG. 14 is a schematic flowchart illustrating a method for transmitting information according to yet another embodiment of the disclosure.

FIG. 15 is a schematic flowchart illustrating a method for transmitting information according to yet another embodiment of the disclosure.

FIG. 16 is a schematic flowchart illustrating a method for transmitting information according to yet another embodiment of the disclosure.

FIG. 17 is a schematic flowchart illustrating a method for transmitting information according to yet another embodiment of the disclosure.

DETAILED DESCRIPTION

Figure 18:
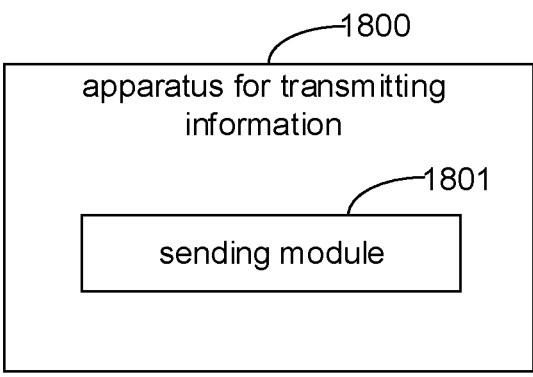
FIG. 18 is a schematic block diagram illustrating an apparatus for transmitting information according to an embodiment of the disclosure.

Embodiments will be described in detail herein, examples of which are illustrated in the accompanying drawings. When the following description refers to the drawings, the same numerals in different drawings refer to the same or similar elements unless otherwise indicated. The implementations described in the following embodiments are not intended to represent all implementations consistent with embodiments of the disclosure. Rather, they are merely examples of apparatus and methods consistent with some aspects of embodiments of the disclosure, as recited in the appended claims.

The terms used in embodiments of the disclosure are only for the purpose of describing particular embodiments, and are not intended to limit embodiments of the disclosure. As used in embodiments of the disclosure and the appended claims, the singular forms "a" and "the" are intended to include the plural forms as well, unless the context clearly dictates otherwise. It will also be understandable that the term "and/or" as used herein refers to and includes any and all possible combinations of one or more of the associated listed items.

It is understandable that although the terms "first," "second," "third," etc. may be used in embodiments of the disclosure to describe various pieces of information, such information should not be limited to these terms. These terms are only used to distinguish the same type of information from each other. For example, without departing from the scope of embodiments of the disclosure, the first information may also be referred to as the second information, and similarly, the second information may also be referred to as the first information. Depending on the context, the words "if" as used herein can be interpreted as "at the time of," "when" or "in response to determining."

Below, embodiments of the disclosure will be described in detail, examples of which are illustrated in the accompanying drawings, in which the same or similar reference numerals refer to the same or similar elements throughout. The embodiments described below with reference to the accompanying drawings are examples, and are intended to explain the disclosure and should not be construed as a limitation of the disclosure.

With the rapid development of wireless communication technology and mobile terminals, multi-card terminal technology has been widely used. The multi-card terminal may be a device provided with multiple SIM (Subscriber Identity Module) cards, in which each SIM card corresponds to a different communication system, so that the multi-card terminal can be provided with services from the multiple communication systems at the same time. Each SIM card in the multi-card terminal usually needs to receive a paging message sent by the network side, to perform a corresponding service based on the received paging message. Therefore, a paging conflict will inevitably occur. That is, a situation in which the time when one SIM card receives the paging message and the time when another SIM card receives the paging message conflict occurs.

In the related art, when the paging conflict occurs for a multi-card terminal, the multi-card terminal will determine a paging priority based on a rule configured by a user. The user-configured rule is subjectively configured by the user, and without data support. As a result, the multi-card terminal may miss an important paging message, resulting in irreparable losses.

In the method for transmitting information according to embodiments of the disclosure, the access network device may send first indication information and/or core network information to the UE, in which the first indication information is configured to indicate whether the core network connected to the access network device supports sending a paging reason and the core network information includes the information of the core network that supports sending the paging reason. Therefore, in embodiments of the disclosure, the UE can know core network(s) that supports sending the paging reason. Based on this, when the core network that supports sending the paging reason sends a paging message to a multi-card UE, the core network can synchronously send the paging reason corresponding to the paging message to the multi-card UE. When the paging conflict occurs, the multi-card UE can determine the priority of the paging message based on the paging reason, to avoid missing any important paging message and reduce losses.

A method and an apparatus for transmitting information, user equipment, an access equipment, a core network and a storage medium according to embodiments of the disclosure will be described in detail below with reference to the accompanying drawings.

FIG. 1 is a schematic flowchart illustrating a method for transmitting information according to an embodiment of the disclosure. The method is performed by an access network device. As illustrated in FIG. 1, the method may include the following.

At block 101, first indication information and/or core network information is sent to a user equipment (UE).

It is noteworthy that, the method according to an embodiment of the disclosure can be applied to any UE. The UE may be a device that provides voice and/or data connectivity to a user. The UE may communicate with one or more core networks via a Radio Access Network (RAN). The UE may be an Internet of Things (IoT) terminal, such as a sensor device, a mobile phone (or called a "cellular" phone), or a computer including an IoT terminal. For example a stationary device, a portable device, a pocket-sized device, a hand-held device, a computer-built-in device, or a vehicle-mounted device. For example, a station (STA), a subscriber unit, a subscriber station, a mobile station, a mobile, a remote station, an access point, a remote terminal, an access terminal, a user terminal, or a user agent. Or, the UE may also be a device of an unmanned aerial vehicle. Or, the UE may also be a vehicle-mounted device. For example, a trip computer with a wireless communication function, or a wireless terminal connected to an external trip computer. Or, the UE may also be a roadside device, for example, a streetlight, a signal light, or other roadside device having a wireless communication function.

In one embodiment of the disclosure, the first indication information may be configured to indicate whether a core network to which the access network device is connected supports sending a paging reason. In one embodiment of the disclosure, the access network device may be an access network device that communicates with the UE. In one embodiment of the disclosure, the access network device may be a base station.

Further, in one embodiment of the disclosure, the access network device may be connected to one core network. In another embodiment of the disclosure, the access network device may be connected to multiple core networks. In one embodiment of the disclosure, when the access network device is connected to multiple core networks, the first indication information may be configured to indicate whether any one of the multiple core networks supports sending the paging reason. In another embodiment of the disclosure, when the access network device is connected to multiple core networks, the first indication information may be configured to indicate whether any multiple core networks in the multiple core networks support sending the paging reason.

In one embodiment of the disclosure, the core network information may include information of a core network that supports sending the paging reason. In one embodiment of the disclosure, the core network information may include information of at least one core network. In one embodiment of the disclosure, the core network may be a core network connected to the access network device. In one embodiment of the disclosure, the core network information may be an identification (ID) of the core network.

Therefore, in one embodiment of the disclosure, the access network device may directly send the first indication information and/or core network information to the UE to notify the UE which core network(s) connected to the access network device supports sending the paging reason.

It is noteworthy that, in one embodiment of the disclosure, the UE may be a multi-card UE. In one embodiment of the disclosure, when the UE is a multi-card UE and at least two cards are activated in the UE, the access network device may adopt the method according to this embodiment to send the first indication information and/or core network information to the UE, so that when the first indication information and/or core network information indicates that the core network to which the access network device is connected supports sending the paging reason, the core network can subsequently send the paging reason while sending the paging message to the UE. Therefore, when a paging conflict occurs again, the UE can determine the paging priority based on the paging reason.

In another embodiment of the disclosure, when the UE is a single-card UE, or when the UE is a multi-card UE but only one card is activated, since a paging conflict will not occur, the access network device does not need to send the first indication information and/or core network information to the UE.

In conclusion, in the method for transmitting information according to embodiments of the disclosure, the access network device may send first indication information and/or core network information to the UE, in which the first indication information is configured to indicate whether the core network connected to the access network device supports sending a paging reason and the core network information includes the information of the core network that supports sending the paging reason. Therefore, in embodiments of the disclosure, the UE can know the core network (s) that supports sending the paging reason. Based on this, when the core network that supports sending the paging reason sends a paging message to a multi-card UE, the core network can synchronously send the paging reason corresponding to the paging message to the multi-card UE. When the paging conflict occurs, the multi-card UE can determine the priority of the paging message based on the paging reason, to avoid missing any important paging message and reduce losses.

FIG. 2 is a schematic flowchart illustrating a method for transmitting information according to another embodiment of the disclosure. The method is performed by an access network device. As illustrated in FIG. 2, the method may include the following.

At block 201, first indication information and/or core network information is sent to the UE through system information.

In one embodiment of the disclosure, for a detailed introduction about the UE, the first indication information, and the core network information, reference may be made to the above-mentioned first embodiment, which is not repeated in this embodiment of the disclosure.

In one embodiment of the disclosure, the system information may include: Minimum system information (MSI) and other system information (OSI).

In one embodiment of the disclosure, when the system information is the MSI, the access network device may directly send the first indication information and/or core network information to the UE through the MSI. Further, in one embodiment of the disclosure, the access network device may broadcast the first indication information and/or core network information through the MSI.

In one embodiment of the disclosure, when the system information is the OSI, the access network device may directly send the first indication information and/or core network information to the UE through the OSI. Further, in one embodiment of the disclosure, the access network device may broadcast the first indication information and/or core network information through the OSI. In another embodiment of the disclosure, the access network device may receive a first request message sent by the UE, to send the first indication information and/or the core network information to the UE through the OSI based on the first request message sent by the UE.

In conclusion, in the method for transmitting information according to embodiments of the disclosure, the access network device may send first indication information and/or core network information to the UE, in which the first indication information is configured to indicate whether the core network connected to the access network device supports sending a paging reason and the core network information includes the information of the core network that supports sending the paging reason. Therefore, in embodiments of the disclosure, the UE can know the core network(s) that supports sending the paging reason. Based on this, when the core network that supports sending the paging reason sends a paging message to a multi-card UE, the core network can synchronously send the paging reason corresponding to the paging message to the multi-card UE. When the paging conflict occurs, the multi-card UE can determine the priority of the paging message based on the paging reason, to avoid missing any important paging message and reduce losses.

FIG. 3 is a schematic flowchart illustrating a method for transmitting information according to another embodiment of the disclosure. The method is performed by an access network device. As illustrated in FIG. 3, the method may include the following.

In block 301, first indication information to a UE through a Radio Resource Control (RRC) signaling.

In one embodiment of the disclosure, reference is made to the above-mentioned first embodiment for the detailed introduction of the UE, the first indication information, and the core network information, which will not be repeated in this embodiment of the disclosure.

In one embodiment of the disclosure, the access network device may send the first indication information to the UE through a unicast RRC signaling.

It is noteworthy that, in one embodiment of the disclosure, in a New Radio (NR) system, the access network device may use RRC Setup signaling and/or RRC Resume signaling and/or RRC Reestablishment signaling and/or RRC Reconfiguration signaling to send the first indication information to the UE.

In another embodiment of the disclosure, in a Long Term Evolution (LTE) system, the access network device may use RRC ConnectionSetup signaling and/or RRC ConnectionReestablishment signaling and/or RRC ConnectionReconfiguration signaling to send the first indication information to the UE.

In addition, it is noteworthy that, in one embodiment of the disclosure, the access network device may also send the core network information to the UE through the RRC signaling. And, in one embodiment of the disclosure, the access network device may send the core network information in the same sending manner as the first indication information.

In conclusion, in the method for transmitting information according to embodiments of the disclosure, the access network device may send first indication information and/or core network information to the UE, in which the first indication information is configured to indicate whether the core network connected to the access network device supports sending a paging reason and the core network information includes the information of the core network that supports sending the paging reason. Therefore, in embodiments of the disclosure, the UE can know the core network(s) that supports sending the paging reason. Based on this, when the core network that supports sending the paging reason sends a paging message to a multi-card UE, the core network can synchronously send the paging reason corresponding to the paging message to the multi-card UE. When the paging conflict occurs, the multi-card UE can determine the priority of the paging message based on the paging reason, to avoid missing any important paging message and reduce losses.

FIG. 4 is a schematic flowchart illustrating a method for transmitting information according to yet another embodiment of the disclosure. The method is performed by an access network device. As illustrated in FIG. 4, the method may include the following.

In block 401, a second request message sent by the UE through RRC signaling is received.

In one embodiment of the disclosure, for the detailed introduction of the UE, reference may be made to the above-mentioned first embodiment, which is not repeated in this embodiment of the disclosure.

In one embodiment of the disclosure, the second request message may include information of a core network inquired by the UE (e.g., the ID of the core network inquired). In one embodiment of the disclosure, the core network inquired by the UE may be included in the core network to which the access network device is connected. In one embodiment of the disclosure, the second request message may include information of at least one core network.

In block 402, the first indication information is sent, based on the second request message, to the UE through a RRC signaling.

In one embodiment of the disclosure, the first indication information may be configured to indicate whether the core network inquired by the UE supports sending the paging reason.

In addition, it is noteworthy that, in one embodiment of the disclosure, the access network device may also notify the UE whether the inquired core network supports sending the paging reason by sending the core network information to the UE.

In detail, in one embodiment of the disclosure, after receiving the second request message, the access network device can determine whether the core network inquired by the UE included in the second request message supports sending the paging reason. When the core network supports sending the paging reason, the access network device can also send the core network information (such as the ID of the core network) to the UE through RRC signaling ID to notify the UE which core network(s) support sending the paging reason. When the core network inquired by the UE does not support sending the paging reason, the access network device may not send the information of the core network that does not support sending the paging reason to the UE. Therefore, after the UE sends the second request message, the UE can first determine whether the UE receives the core network information. If the core network information is received within a preset time period, it means that the core network included in the core network information supports sending the paging reason. If the core network information is not received within the preset time period, it means that the core network inquired does not support sending the paging reason.

In conclusion, in the method for transmitting information according to embodiments of the disclosure, the access network device may send first indication information and/or core network information to the UE, in which the first indication information is configured to indicate whether the core network connected to the access network device supports sending a paging reason and the core network information includes the information of the core network that supports sending the paging reason. Therefore, in embodiments of the disclosure, the UE can know the core network (s) that supports sending the paging reason. Based on this, when the core network that supports sending the paging reason sends a paging message to a multi-card UE, the core network can synchronously send the paging reason corresponding to the paging message to the multi-card UE. When the paging conflict occurs, the multi-card UE can determine the priority of the paging message based on the paging reason, to avoid missing any important paging message and reduce losses.

FIG. 5 is a schematic flowchart illustrating a method for transmitting information according to another embodiment of the disclosure. The method is performed by a core network. As illustrated in FIG. 5, the method may include the following.

In block 501, second indication information is sent to the UE through a Non-Access Stratum (NAS) signaling.

In one embodiment of the disclosure, reference is made to the above-mentioned first embodiment for the detailed introduction of the UE, and the detailed introduction is not repeated in this embodiment of the disclosure.

In one embodiment of the disclosure, the second indication information may be configured to indicate whether the core network supports sending a paging reason. In detail, in one embodiment of the disclosure, the core network may directly send the second indication information to the UE through the access network device or other devices via the NAS signaling, to notify the UE whether the core network supports sending the paging reason. For the convenience of description, in embodiments of the disclosure, "sending by the core network to the UE through the access network device or other devices" is referred to as "sending by the core network to the UE". Similarly, "sending by the UE to the core network through the access network device or other devices" is referred to as "sending by the UE to the core network".

In one embodiment of the disclosure, in the NR system, the core network may send the second indication information to the UE through the Registration Accept signaling.

Further, in another embodiment of the disclosure, in the LTE system, the core network may send the second indication information to the UE through the Attach Accept signaling.

In addition, it is noteworthy that, in one embodiment of the disclosure, the core network may also send core network information to the UE through the NAS signaling, and the core network information may include information of the core network (for example, the ID of the core network). In this way, the UE is notified whether the core network supports sending the paging reason.

In conclusion, in the method for transmitting information according to embodiments of the disclosure, the core network may send second indication information to the UE, in which the second indication information is configured to indicate whether the core network supports sending the paging reason. Therefore, in embodiments of the disclosure, the UE can know the core network(s) that supports sending the paging reason. Based on this, when the core network that supports sending the paging reason sends a paging message to a multi-card UE, the core network can synchronously send the paging reason corresponding to the paging message to the multi-card UE. The UE can determine the priority of the paging message based on the paging reason, to avoid missing any important paging messages and reduce losses.

FIG. 6 is a schematic flowchart illustrating a method for transmitting information according to yet another embodiment of the disclosure. The method is performed by a core network. As illustrated in FIG. 6, the method may include the following.

In block 601, the type of the UE is determined based on registration information of the UE.

In one embodiment of the disclosure, the core network may obtain the registration information of the UE, and determine the type of the UE based on the registration information of the UE, to subsequently determine, based on the type of the UE, whether to send the second indication information to the UE. In one embodiment of the disclosure, the type of UE may include, for example, a type of "single SIM card and single standby", a type of "multiple SIM cards and single standby", a type of "multiple SIM cards and multiple standby", a type of "multiple SIM cards, single standby and single pass", a type of "multiple SIM cards, multiple standby, and single pass", a type of "multiple SIM cards, multiple standby, and multiple pass", a type of "multiple SIM cards, single standby, and single SIM card activated", or a type of "multiple SIM cards, multiple standby, and multiple SIM cards activated".

In block 602, it is determined, based on the type of the UE, whether to send the second indication information to the UE through a NAS signaling.

In one embodiment of the disclosure, since the paging conflict will not occur for a single-card single-standby UE or a multi-card multi-standby single-card activation UE, when the type of the UE is the single-card single-standby UE or the multi-card multi-standby single-card activation UE, the core network does not need to send the second indication information to the UE, and when the type of the UE is the multi-card multi-standby multi-card activation type, the core network can send the second indication information to the UE.

For the introduction of sending, by the core network, the second indication information to the UE through the NAS signaling, reference may be made to the fifth embodiment, which is not repeated in this embodiment of the disclosure.

In conclusion, in the method for transmitting information according to embodiments of the disclosure, the core network may send second indication information to the UE, in which the second indication information is configured to indicate whether the core network supports sending the paging reason. Therefore, in embodiment of the disclosure, the UE can know which core network(s) supports sending the paging reason. Based on this, when the core network that supports sending the paging reason sends a paging message to a multi-card UE, the core network can synchronously send the paging reason corresponding to the paging message to the multi-card UE. The UE can determine the priority of the paging message based on the paging reason, to avoid missing any important paging message and reduce losses.

FIG. 7 is a schematic flowchart illustrating a method for transmitting information according to yet another embodiment of the disclosure. The method is performed by a core network. As illustrated in FIG. 7, the method may include the following.

In block 701, a third request message sent by the UE is received.

In one embodiment of the disclosure, the detailed introduction of the UE may refer to the first embodiment, which is not repeated in this embodiment of the disclosure.

In block 702, second indication information is sent, based on the third request message, to the UE through the NAS signaling.

The detailed introduction of sending by the core network the second indication information to the UE through the NAS signaling may refer to the fifth embodiment, which is not repeated in this embodiment of the disclosure.

In conclusion, in the method for transmitting information according to embodiments of the disclosure, the core network may send second indication information to the UE, in which the second indication information is configured to indicate whether the core network supports sending the paging reason. Therefore, in embodiments of the disclosure, the UE can know which core network(s) supports sending the paging reason. Based on this, when the core network that supports sending the paging reason sends a paging message to a multi-card UE, the core network can synchronously send the paging reason corresponding to the paging message to the multi-card UE. The UE can determine the priority of the paging message based on the paging reason, to avoid missing any important paging message and reduce losses.

FIG. 8 is a schematic flowchart illustrating a method for transmitting information according to yet another embodiment of the disclosure. The method is performed by a UE. As illustrated in FIG. 8, the method may include the following.

In block 801, information is received. The information may include at least one of: first indication information sent by the access network device, core network information sent by the access network device, or second indication information sent by the core network.

In one embodiment of the disclosure, the detailed introduction of the first indication information, the core network information, and the second indication information may refer to the any of the above-mentioned embodiments, which is not repeated in this embodiment of the disclosure.

Further, in one embodiment of the disclosure, the information received in the block 801 may only include the first indication information.

In one implementation of the disclosure, when the information only includes the first indication information, the method may include the following as illustrated in FIG. 9.

In block 901: first indication information sent by the access network device is received through system information.

That is, in one embodiment of the disclosure, the UE may directly receive, through the system information, the first indication information sent by the access network device.

In one embodiment of the disclosure, the system information may include MSI and OSI.

In one embodiment of the disclosure, when the system information is the MSI, the UE can directly receive, through the MSI, the first indication information sent by the access network device.

In one embodiment of the disclosure, when the system information is the OSI, the UE can directly receive, through the OSI, the first indication information sent by the access network device. In another embodiment of the disclosure, when the system information is the OSI, the UE may send a first request message to the access network device and receive the first indication information sent, through the OSI based on the first request message, by the access network device.

In another embodiment of the disclosure, when the information only includes the first indication information, the method may further include the following as illustrated in FIG. 10.

In block 1001, first indication information sent by an access network device is received through a RRC signaling.

That is, in another embodiment of the disclosure, the UE may directly receive, through the RRC signaling, the first indication information sent by the access network device.

In one embodiment of the disclosure, in the NR system, the UE may receive, through the RRC Setup signaling and/or the RRC Resume signaling and/or the RRC Reestablishment signaling and/or the RRC Reconfiguration signaling, the first indication information sent by the access network device.

In another embodiment of the disclosure, in the LTE system, the UE may receive, through the RRC Connection Setup signaling and/or the RRC Connection Reestablishment signaling and/or the RRC Connection Reconfiguration, the first indication information sent by the access network device.

In one embodiment of the disclosure, in addition to the above-mentioned "the UE can directly receive, through the RRC signaling, the first indication information sent by the access network device", the UE can first send a second request message through a RRC signaling to the access network device, and then receives the first indication information sent by the access network device based on the second request message.

In one embodiment of the disclosure, the UE may send the second request message to the access network device through a unicast RRC signaling.

In one embodiment of the disclosure, in an NR system, the UE may send the second request message to the access network device through the RRC SetupComplete signaling and/or the RRC ResumeComplete signaling and/or the RRC ReestablishmentComplete signaling. In another embodiment of the disclosure, in the LTE system, the UE may send the second request message to the access network device through the RRC ConnectionSetupComplete signaling and/or the RRC ConnectionReestablishmentComplete signaling.

In another embodiment of the disclosure, the information received in the block 801 may also only include the core network information.

In one implementation of the disclosure, when the information only includes the core network information, the method may include the following as illustrated in FIG. 11.

In block 1101, the core network information sent by an access network device is received through system information.

That is, in one embodiment of the disclosure, the UE may directly receive, through the system information, the core network information sent by the access network device.

In one embodiment of the disclosure, the system information may include: MSI and OSI.

In one embodiment of the disclosure, when the system information is the MSI, the UE can directly receive, through the MSI, the core network information sent by the access network device.

In one embodiment of the disclosure, when the system information is the OSI, the UE can directly receive, through the OSI, the core network information sent by the access network device. In another embodiment of the disclosure, when the system message is the OSI, the UE may send a first request message to the access network device and receive the core network information sent, through the OSI based on the first request message, by the access network device.

In another embodiment of the disclosure, when the information only includes the core network information, the method may further include the following as illustrated in FIG. 12.

In block 1201, core network information sent by an access network device is received through the RRC signaling.

That is, in another embodiment of the disclosure, the UE may directly receive, through the RRC signaling, the core network information sent by the access network device.

In one embodiment of the disclosure, in the NR system, the UE may receive, through the RRC Setup signaling and/or the RRC Resume signaling and/or the RRC Reestablishment signaling and/or the RRC Reconfiguration signaling, the core network information sent by the access network device.

In another embodiment of the disclosure, in the LTE system, the UE may receive, through the RRC Connection Setup signaling and/or the RRC Connection Reestablishment signaling and/or the RRC Connection Reconfiguration, the core network information sent by the access network device.

In one embodiment of the disclosure, in addition to the above-mentioned "the UE can directly receive, through the RRC signaling, the core network information sent by the access network device", the UE can first send a second request message through the RRC signaling to the access network device, and then receive the core network information sent, based on the second request message, by the access network device.

In one embodiment of the disclosure, the UE may send the second request message to the access network device through the unicast RRC signaling. Further, in one embodiment of the disclosure, in an NR system, the UE may send the second request message to the access network device through the RRC SetupComplete signaling and/or the RRC ResumeComplete signaling and/or the RRC ReestablishmentComplete signaling. In another embodiment of the disclosure, in the LTE system, the UE may send the second request message to the access network device through the RRC ConnectionSetupComplete signaling and/or the RRC ConnectionReestablishmentComplete signaling.

In another embodiment of the disclosure, the information received in the block 801 may include the first indication information and the core network information.

In one implementation of the disclosure, when the information includes the first indication information and core network information, the method may include the following as illustrated in FIG. 13:

In block 1301, the first indication information and the core network information sent by the access network device are received.

The method for receiving the first indication information and the core network information by the UE may refer to the above description, which is not repeated in this embodiment.

In detail, in one embodiment of the disclosure, the UE may receive, through system information, the first indication information and the core network information sent by the access network device.

In another embodiment of the disclosure, the UE may receive, through the RRC signaling, the first indication information and the core network information sent by the access network device.

In yet another embodiment of the disclosure, the UE may receive, through the system information, the first indication information sent by the access network device and receive, through the RRC signaling, the core network information sent by the access network device.

In another embodiment of the disclosure, the UE may receive, through the RRC signaling, the first indication information sent by the access network device and receive, through the system information, the core network information sent by the access network device.

In one embodiment of the disclosure, the information received in the block 801 may only include the second indication information.

In one implementation of the disclosure, when the information only includes the second indication information, the method may include the following as illustrated in FIG. 14:

In block 1401, second indication information sent by the core network is received through a NAS signaling.

That is, in one embodiment of the disclosure, the UE may directly receive, through the NAS signaling, the second indication information sent by the core network.

In one embodiment of the disclosure, in the NR system, the UE may receive the second indication information sent, through the Registration Accept signaling, by the core network. In another embodiment of the disclosure, in the LTE system, the UE may receive the second indication information sent, through the Attach Accept signaling, by the core network.

In one embodiment of the disclosure, in addition to the above-mentioned "UE can directly receive, through the NAS signaling, the second indication information sent by the core network", the UE can send a third request message to the core network first, and then receive the second indication information sent, based on the third request message, by the core network.

Further, in one embodiment of the disclosure, the information received in the block 801 may include the first indication information and the second indication information.

In one implementation of the disclosure, when the information includes the first indication information and the second indication information, the method may include the following as illustrated in FIG. 15:

In block 1501, the first indication information sent by the access network device and the second indication information sent by the core network are received.

For a method for receiving the first indication information and the second indication information, reference may be made to the above description, which is not repeated in this embodiment.

In detail, in one embodiment of the disclosure, the UE may receive, through the system information, the first indication information sent by the access network device and receive, through the NAS signaling, the second indication information sent by the core network.

In another embodiment of the disclosure, the UE may receive, through the RRC signaling, the first indication information sent by the access network device and receive, through the NAS signaling, the second indication information sent by the core network.

Further, in one embodiment of the disclosure, the information received in the block 801 may include the core network information and the second indication information.

In one implementation of the disclosure, when the information only includes the core network information and the second indication information, the method may include the following as illustrated in FIG. 16:

In block 1601, the core network information sent by the access network device and the second indication information sent by the core network are received.

For a method for receiving the core network information and the second indication information, reference may be made to the above description, which will not be repeated in this embodiment.

In detail, in one embodiment of the disclosure, the UE may receive, through the system information, the core network information sent by the access network device and receive, through the NAS signaling, the second indication information sent by the core network.

In another embodiment of the disclosure, the UE may receive, through the RRC signaling, the core network information sent by the access network device and receive, through the NAS signaling, the second indication information sent by the core network.

In one embodiment of the disclosure, the information received in the block 801 may include the first indication information, the core network information, and the second indication information.

In one implementation of the disclosure, when the information includes the first indication information, the core network information and the second indication information, the method may include the following as illustrated in FIG. 17.

In block 1701, the first indication information and the core network information sent by the access network device, and the second indication information sent by the core network are received.

The method for receiving the first indication information, the core network information, and the second indication information may refer to the above description, which is not repeated in this embodiment.

In detail, in one embodiment of the disclosure, the UE may receive, through the system information, the first indication information and the core network information sent by the access network device, and receive, through the NAS signaling, the second indication information sent by the core network.

In another embodiment of the disclosure, the UE may receive, through the RRC signaling, the first indication information and the core network information sent by the access network device, and receive, through the NAS signaling, the second indication information sent by the core network.

In yet another embodiment of the disclosure, the UE may receive, through the system information, the first indication information sent by the access network device, receive, through the RRC signaling, the core network information sent by the access network device, and receive, through the NAS signaling, the second indication information sent by the core network.

In yet another embodiment of the disclosure, the UE may receive, through the RRC signaling, the first indication information sent by the access network device, receive, through the system information, the core network information sent by the access network device, and receive, through the NAS signaling, the core network information sent by the core network.

In conclusion, in the method for transmitting information according to embodiments of the disclosure, the UE can receive at least one of the first indication information, the core network information, or the second indication information, and the UE can know, based on the received information, which core network(s) supports sending the paging reason. Based on this, when the core network that supports sending the paging reason sends a paging message to a multi-card UE, the core network can synchronously send the paging reason corresponding to the paging message to the multi-card UE. The UE can determine the priority of the paging message based on the paging reason, to avoid missing any important paging message and reduce losses.

FIG. 18 is a schematic block diagram illustrating an apparatus for transmitting information according to an embodiment of the disclosure. As illustrated in FIG. 18, the apparatus 1800 may include a sending module 1801.

The sending module 1801 is configured to send first indication information and/or core network information to the UE. The first indication information is configured to indicate whether a core network connected to the access network device supports sending a paging reason, and the core network information includes information of a core network that supports sending the paging reason.

In conclusion, in the apparatus for transmitting information according to embodiments of the disclosure, the access network device may send the first indication information and/or the core network information to the UE, in which the first indication information is configured to indicate whether the core network connected to the access network device supports sending the paging reason, and the core network information includes the information of the core network that supports sending the paging reason. Therefore, in embodiments of the disclosure, the UE can know which core network(s) supports sending the paging reason. Based on this, when the core network that supports sending the paging reason sends a paging message to a multi-card UE, the core network can synchronously send the paging reason corresponding to the paging message to the multi-card UE. The UE can determine the priority of the paging message based on the paging reason, to avoid missing any important paging message and reduce losses.

In one embodiment of the disclosure, the sending module 1801 is further configured to send the first indication information and/or the core network information to the UE through system information.

Further, in another embodiment of the disclosure, the system information includes minimum system information.

Further, in another embodiment of the disclosure, the system information includes other system information.

Further, in another embodiment of the disclosure, the above apparatus is further configured to obtain a first request message sent by the UE, so that the access network device sends, through the other system information based on the first request message, the first indication information and/or the core network information to the UE.

Further, in another embodiment of the disclosure, the sending module 1801 is further configured to send the first indication information to the UE through a RRC signaling.

Further, in another embodiment of the disclosure, the above-mentioned apparatus is further configured to obtain a second request message sent, through the RRC signaling, by the UE, in which the second request message includes information of a core network inquired by the UE, and the core network inquired by the UE is included in a core network to which the access network device is connected.

Further, in another embodiment of the disclosure, the first indication information is configured to indicate whether the core network inquired by the UE supports sending the paging reason.

Figure 19:
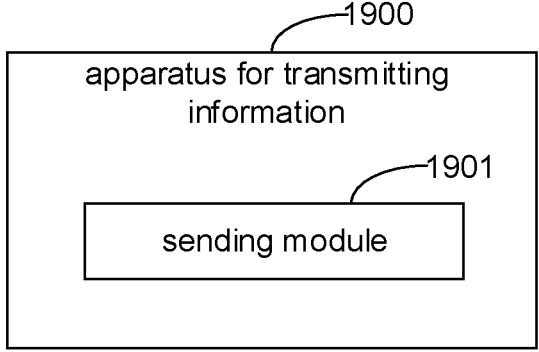
FIG. 19 is a schematic block diagram illustrating another apparatus for transmitting information according to an embodiment of the disclosure.

FIG. 19 is a schematic block diagram illustrating an apparatus for transmitting information according to another embodiment of the disclosure. As illustrated in FIG. 19, the apparatus 1900 may include a sending module 1901.

The sending module 1901 is configured to send second indication information to the UE through a NAS signaling, in which the second indication information is configured to indicate whether the core network supports sending a paging reason.

In conclusion, in the apparatus for transmitting information according to embodiments of the disclosure, the core network may send the second indication information to the UE, in which the second indication information is configured to indicate whether the core network supports sending the paging reason. Therefore, in embodiments of the disclosure, the UE can know which core network(s) supports sending the paging reason. Therefore, in embodiments of the disclosure, the UE can know which core network(s) supports sending the paging reason. Based on this, when the core network that supports sending the paging reason sends a paging message to a multi-card UE, the core network can synchronously send the paging reason corresponding to the paging message to the multi-card UE. The UE can determine the priority of the paging message based on the paging reason, to avoid missing any important paging message and reduce losses.

In one embodiment of the disclosure, the sending module 1901 is further configured to:

determine a type of the UE based on registration information of the UE; and determine, based on the type of the UE, whether to send the second indication information to the UE.

Further, in another embodiment of the t disclosure, when the type of the UE is a multi-card UE and more than one card in the UE is activated, the second indication information is sent to the UE.

Further, in another embodiment of the disclosure, the system information includes other system information.

Further, in another embodiment of the disclosure, the above apparatus is further configured to: obtain a third request message sent by the UE, so that the core network sends, through the NAS signaling based on the third request message, the second indication information to the UE.

Figure 20:
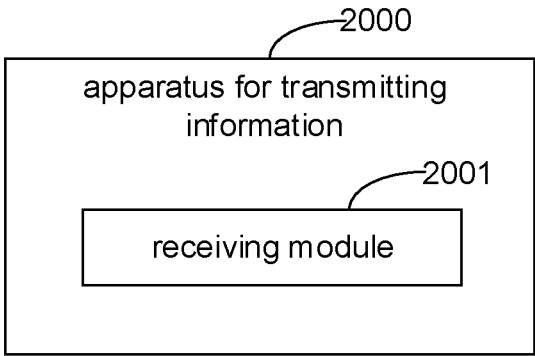
FIG. 20 is a schematic block diagram illustrating an apparatus for transmitting information according to yet another embodiment of the disclosure.

FIG. 20 is a schematic block diagram illustrating an apparatus for transmitting information according to yet another embodiment of the disclosure. As illustrated in FIG. 20, the apparatus 2000 may include a receiving module 2001.

The receiving module 2001 is configured to receive information, in which the information includes at least one of first indication information sent by the access network device, core network information sent by the access network device, or second indication information sent by the core network; in which the first indication information is configured to indicate whether the core network connected to the access network device supports sending a paging reason, the core network information includes the information of a core network that supports sending the paging reason, and the second indication information is configured to indicate whether the core network that sends the second indication information supports sending the paging reason.

In conclusion, in the apparatus for transmitting information according to embodiments of the disclosure, the UE may receive at least one of the first indication information, the core network information, or the second indication information, and the UE may know which core network(s) supports sending the paging reason based on the received information. Based on this, when the core network that supports sending the paging reason sends a paging message to a multi-card UE, the core network can synchronously send the paging reason corresponding to the paging message to the multi-card UE. The UE can determine the priority of the paging message based on the paging reason, to avoid missing any important paging message and reduce losses.

In one embodiment of the disclosure, the receiving module 2001 is further configured to: receive, through the system information, the first indication information and/or the core network information sent by the access network device.

Further, in another embodiment of the disclosure, the system information includes minimum system information.

Further, in another embodiment of the disclosure, the system information includes other system information.

Further, in another embodiment of the disclosure, the above-mentioned apparatus is further configured to: send a first request message to the access network device.

Further, in another embodiment of the disclosure, the receiving module 2001 is further configured to:

receive, through the RRC signaling, the first indication information sent by the access network device.

Further, in another embodiment of the disclosure, the above-mentioned device is further configured to:

send a second request message to the UE through the RRC signaling, in which the second request message includes information of a core network inquired by the UE, and the core network inquired by the UE is included in the core network to which the access network device is connected.

Further, in another embodiment of the disclosure, the receiving module 2001 is further configured to:

receive, through the NAS signaling, the second indication information sent by the core network.

Further, in another embodiment of the disclosure, the above-mentioned apparatus is further configured to: send a third request message to the core network.

In order to realize the above embodiments, the disclosure further provides a computer storage medium.

The computer storage medium according to embodiments of the disclosure has an executable program stored thereon. After the executable program is executed by a processor, any of the methods illustrated in FIG. 1 to FIG. 4 or FIG. 5 to FIG. 7 or FIG. 8 to FIG. 17 can be performed.

In order to implement the above embodiments, the disclosure further provides a computer program product. The computer program product includes a computer program. When the computer program is executed by a processor, any of the methods illustrated in FIG. 1 to FIG. 4 or FIG. 5 to FIG. 7 or FIG. 8 to FIG. 17 is performed.

In addition, in order to implement the above-mentioned embodiments, the disclosure further provides a computer program. When the computer program is executed by a processor, any of the methods illustrated in FIG. 1 to FIG. 4 or FIG. 5 to FIG. 7 or FIG. 8 to FIG. 17 is performed.

Figure 21:
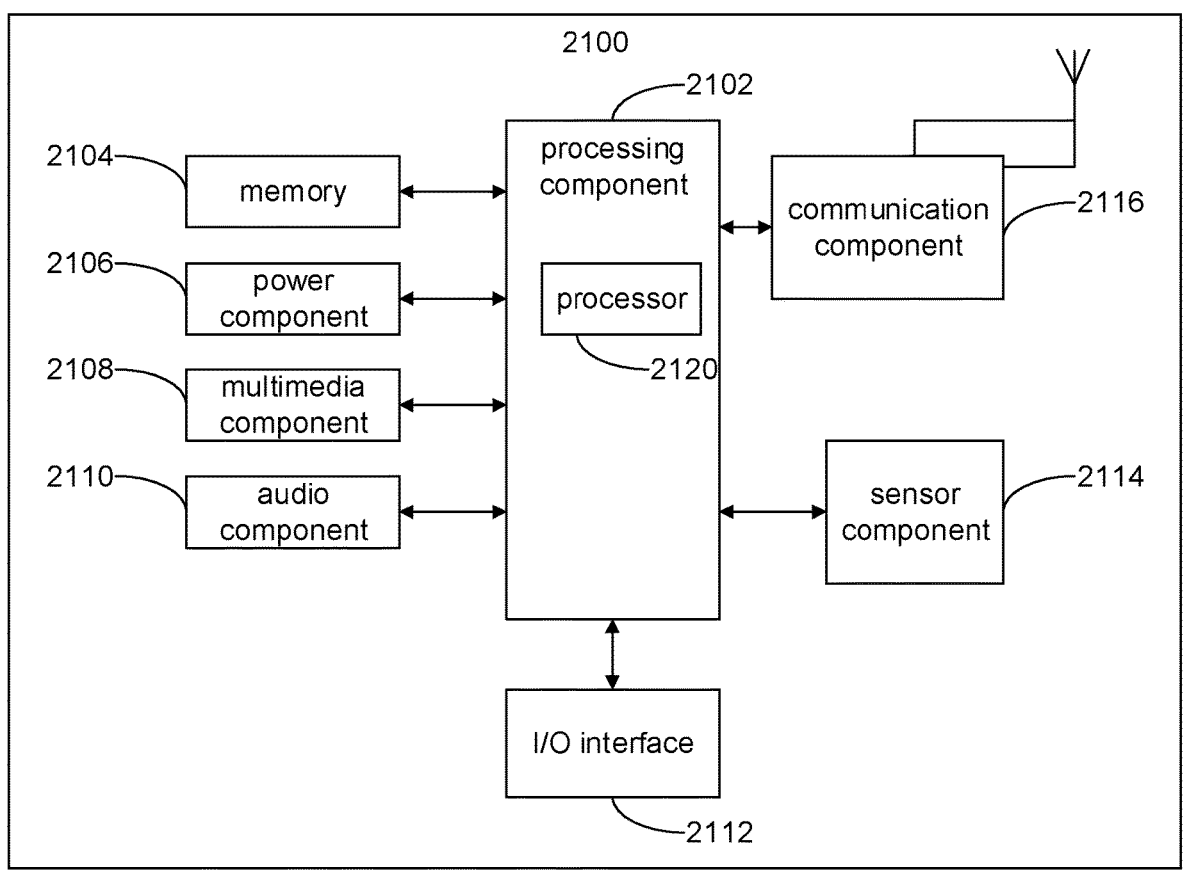
FIG. 21 is a block diagram illustrating a user equipment according to an embodiment of the disclosure.

FIG. 21 is a block diagram illustrating a UE 2100 according to an embodiment of the disclosure. For example, the UE 2100 may be a mobile phone, a computer, a digital broadcast terminal device, a messaging device, a game console, a tablet device, a medical device, a fitness device, a personal digital assistant, or the like.

As illustrated in FIG. 21, the UE 2100 may include at least one of the following components: a processing component 2102, a memory 2104, a power component 2106, a multimedia component 2108, an audio component 2110, an input/output (I/O) interface 2112, a sensor component 2114, or a communication component 2116.

The processing component 2102 generally controls the overall operations of the UE 2100, such as operations associated with display, phone calls, data communications, camera operations, and recording operations. The processing component 2102 can include at least one processor 2120 to execute instructions to perform all or part of the steps of the above-described methods. In addition, the processing component 2102 can include at least one module that facilitates the interaction between the processing component 2102 and other components. For example, processing component 2102 may include a multimedia module to facilitate the interaction between the multimedia component 2108 and the processing component 2102.

The memory 2104 is configured to store various types of data to support operations at the UE 2100. Examples of such data include instructions for any application or method operating on the UE 2100, contact data, phonebook data, messages, pictures, videos, or the like. The memory 2104 may be implemented by any type of volatile or non-volatile storage device or combination thereof, such as static random access memory (SRAM), electrically erasable programmable read only memory (EEPROM), erasable Programmable Read Only Memory (EPROM), Programmable Read Only Memory (PROM), Read Only Memory (ROM), Magnetic Memory, Flash Memory, Magnetic or Optical Disk.

The power component 2106 provides power to various components of the UE 2100. The power component 2106 may include a power management system, at least one power source, and other components associated with generating, managing, and distributing power to the UE 2100.

The multimedia component 2108 includes screens that provide an output interface between the UE 2100 and the user. In some embodiments, the screen may include a liquid crystal display (LCD) and a touch panel (TP). If the screen includes a touch panel, the screen may be implemented as a touch screen to receive input signals from a user. The touch panel includes at least one touch sensor to sense touch, swipe, and gestures on the touch panel. The touch sensor may not only sense the boundaries of a touch or swipe action, but also detect wake-up time and pressure associated with the touch or swipe action. In some embodiments, the multimedia component 2108 includes a front-facing camera and/or a rear-facing camera. When the UE 2100 is in an operation mode, such as a shooting mode or a video mode, the front-facing camera and/or the rear-facing camera may receive external multimedia data. Each of the front-facing and rear-facing cameras can be a fixed optical lens system or have focal length and optical zoom capability.

The audio component 2110 is configured to output and/or input audio signals. For example, the audio component 2110 includes a microphone (MIC) that is configured to receive external audio signals when the UE 2100 is in the operating modes, such as call mode, recording mode, and voice recognition mode. The received audio signal may be further stored in the memory 2104 or transmitted via the communication component 1916. In some embodiments, the audio component 2110 also includes a speaker for outputting audio signals.

The I/O interface 2112 provides an interface between the processing component 2102 and a peripheral interface module, which may be a keyboard, a click wheel, a button, and the like. These buttons may include, but are not limited to: home button, volume buttons, start button, and lock button.

The sensor component 2114 includes at least one sensor for providing the UE 2100 with various aspects of the status assessment. For example, the sensor component 2114 can detect the open/closed state of the UE 2100, the relative positioning of components, such as the display and keypad of the UE 2100. The sensor component 2114 can also detect the position change of the UE 2100 or a component of the UE 2100, the presence or absence of UE 2100 contact between the user and the UE 2100, the orientation or acceleration/deceleration of the UE and the temperature change of the UE 2100. The sensor component 2114 may include a proximity sensor configured to detect the presence of nearby objects in the absence of any physical contact. The sensor component 2114 may also include a light sensor, such as a CMOS or CCD image sensor, for use in imaging applications. In some embodiments, the sensor component 2114 may also include an acceleration sensor, a gyroscope sensor, a magnetic sensor, a pressure sensor, or a temperature sensor.

The communication component 2116 is configured to facilitate wired or wireless communications between the UE 2100 and other devices. The UE 2100 can access a wireless network based on a communication standard, such as WiFi, 2G or 3G, or a combination thereof. In one embodiment, the communication component 2116 receives broadcast signals or broadcast related information from an external broadcast management system via a broadcast channel. In an embodiment, the communication component 2116 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an embodiment, the UE 2100 may be implemented by at least one of the Application Specific Integrated Circuit (ASIC), the Digital Signal Processor (DSP), the Digital Signal Processing Device (DSPD), the Programmable Logic Device (PLD), the Field Programmable Gate Array (FPGA), the controller, the microcontroller, the microprocessor or other electronic components for performing the above methods.

Figure 22:
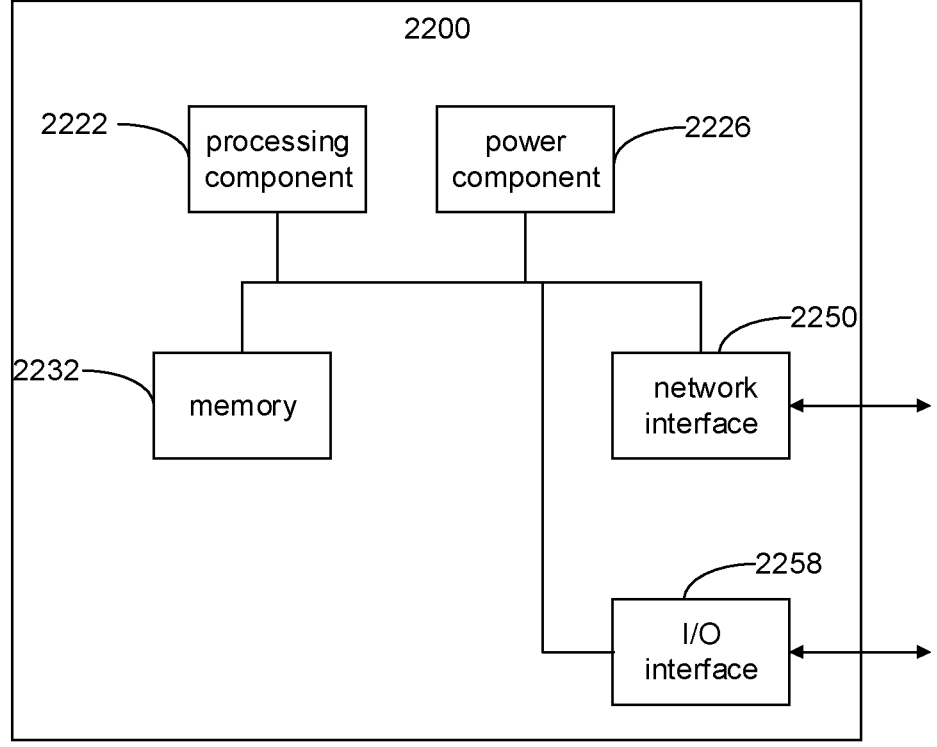
FIG. 22 is a block diagram illustrating a base station according to an embodiment of the disclosure.

FIG. 22 is a schematic block diagram illustrating a base station 2200 according to an embodiment of the application. For example, the base station 2200 may be provided as a base station. As illustrated in FIG. 22, the base station 2200 includes a processing component 2222, which further includes at least one processor, and a memory resource, represented by the memory 2232, for storing instructions executable by the processing component 2222, such as an application program. An application program stored in memory 2232 may include one or more modules, each corresponding to a set of instructions. Furthermore, the processing component 2222 is configured to execute instructions to perform any of the aforementioned methods applied to the base station, e.g., the method illustrated in FIG. 1.

The base station 2200 may also include a power component 2226 configured to perform power management of the base station 2200, a wired or wireless network interface 2250 configured to connect the base station 2200 to a network, and an input output (I/O) interface 2258. The base station 2200 may operate based on an operating system stored in the memory 2232, such as Windows Server™, Mac OS X™, Unix™, Linux™, Free BSD™ or the like.

In order to implement the above embodiments, the disclosure further provides a core network. The core network includes a transceiver; a memory; and a processor connected to the transceiver and the memory and configured to control the transceiver to send and receive wireless signals and perform the methods described in FIG. 5 to FIG. 7 by executing computer-executable instructions on the memory.

In conclusion, in the method for transmitting information according to embodiments of the disclosure, the access network device may send first indication information and/or core network information to the UE, in which the first indication information is configured to indicate whether the core network connected to the access network device supports sending a paging reason and the core network information includes the information of the core network that supports sending the paging reason; or, the core network can send second indication information to the UE, in which the second indication information is configured to indicate whether the core network supports sending the paging reason. Therefore, in embodiments of the disclosure, the UE can know core network(s) that supports sending the paging reason. Based on this, when the core network that supports sending the paging reason sends a paging message to a multi-card UE, the core network can synchronously send the paging reason corresponding to the paging message to the multi-card UE. When the paging conflict occurs, the multi-card UE can determine the priority of the paging message based on the paging reason, to avoid missing any important paging message and reduce losses.

Other embodiments of the disclosure will readily occur to those skilled in the art upon consideration of the specification and practice of the disclosure. This disclosure is intended to cover any variations, uses, or adaptations of the disclosure that follow the general principles of the disclosure and include common knowledge or techniques in the technical field not disclosed by this disclosure. The specification and examples are to be regarded as examples only, with the true scope and spirit of the disclosure being indicated by the following claims.

It is understandable that the disclosure is not limited to the precise structures described above and illustrated in the accompanying drawings, and that various modifications and changes may be made without departing from the scope thereof. The scope of the disclosure is limited only by the appended claims.

What is claimed is:

1. A method for transmitting information, performed by an access network device, comprising:

sending at least one of first indication information or core network information to a user equipment (UE), wherein the first indication information is configured to indicate whether a core network connected to the access network device supports sending a paging reason, and the core network information includes information of a core network that supports sending the paging reason;

wherein sending the first indication information to the UE comprises: sending the first indication information to the UE through a radio resource control (RRC) signaling;

wherein the method further comprises: acquiring a second request message sent, through a RRC signaling, by the UE, wherein the second request message includes information of a core network inquired by the UE, and the core network inquired by the UE is included in the core network connected to the access network device;

wherein the first indication information is configured to indicate whether the core network inquired by the UE supports sending the paging reason.

2. The method of claim 1, wherein sending at least one of the first indication information or the core network information to the UE comprises:

sending at least one of the first indication information or the core network information to the UE through system information.

3. The method of claim 2, wherein the system information comprises minimum system information; or the system information comprises other system information.

4. The method of claim 3, before sending at least one of the first indication information or the core network information to the UE through the system information, further comprising:

obtaining a first request message sent by the UE to enable the access network device to send, through the other system information based on the first request message, at least one of the first indication information or the core network information to the UE.

5. An access network device, comprising: a transceiver; a memory; and a processor connected to the transceiver and the memory and configured to control the transceiver to transmit and receive a wireless signal and perform claim 1 by executing computer-executable instructions on the memory.

6. A method for transmitting information, performed by a core network, comprising:

sending second indication information to a user equipment (UE) through a non-access stratum (NAS) signaling, wherein the second indication information is configured to indicate whether the core network supports sending a paging reason; and acquiring a second request message sent by the UE, wherein the second request message includes information of a core network inquired by the UE, and the core network inquired by the UE is included in a core network connected to an access network device;

wherein the second indication information is configured to indicate whether the core network inquired by the UE supports sending the paging reason.

7. The method of claim 6, before sending the second indication information to the UE through the NAS signaling, further comprising:

determining a type of the UE based on registration information of the UE; and determining, based on the type of the UE, whether to send the second indication information to the UE.

8. The method of claim 7, wherein in response to the type of the UE being a multi-card UE and more than one card in the UE being activated, the second indication information is sent to the UE.

9. The method of claim 6, before sending the second indication information to the UE through the NAS signaling, further comprising:

acquiring a third request message sent by the UE, to enable the core network to send, through the NAS signaling based on the third request message, the second indication information to the UE.

10. A core network, comprising: a transceiver; a memory; and a processor connected to the transceiver and the memory and configured to control the transceiver to transmit and receive a wireless signal and perform the method of claim 6 by executing computer-executable instructions on the memory.

11. A method for transmitting information, performed by a user equipment (UE), comprising:

receiving information, wherein the information comprises at least one of first indication information sent by an access network device, core network information sent by the access network device, or second indication information sent by a core network; in which the first indication information is configured to indicate whether a core network connected to the access network device supports sending a paging reason, the core network information includes information of a core network that supports sending the paging reason, and the second indication information is configured to indicate whether the core network sending the second indication information supports sending the paging reason;

wherein the first indication information sent by the access network device is received through a radio resource control (RRC) signaling;

wherein before receiving the first indication information sent by the access network device through the RRC signaling, the method further comprises sending a second request message to the UE through a RRC signaling, wherein the second request message includes information of a core network inquired by the UE, and the core network inquired by the UE is included in the core network connected to the access network device.

12. The method of claim 11, wherein at least one of the first indication information or the core network information sent by the access network device is received through system information.

13. The method of claim 12, wherein the system information comprises minimum system information; or the system information comprises other system information.

14. The method of claim 13, before receiving the information, further comprising:

sending a first request message to the access network device.

15. The method of claim 11, wherein the second indication information sent by the core network is received through a non-access stratum (NAS) signaling.

16. The method of claim 11, before receiving the information, further comprising:

sending a third request message to the core network.

17. A user equipment (UE), comprising: a transceiver; a memory; and a processor connected to the transceiver and the memory and configured to control the transceiver to transmit and receive a wireless signal and perform the method of claim 11 by executing computer-executable instructions on the memory.

\* \* \* \* \*